(12) United States Patent
Giles et al.

(10) Patent No.: US 7,403,929 B1
(45) Date of Patent: Jul. 22, 2008

(54) APPARATUS AND METHODS FOR EVALUATING HYPERDOCUMENTS USING A TRAINED ARTIFICIAL NEURAL NETWORK

(76) Inventors: Ellis Robinson Giles, P.O. Box 540604, Houston, TX (US) 77254; Vick Forrest Giles, P.O. Box 540604, Houston, TX (US) 77254

( * ) Notice: Subject to any disclaimer, the term of this patent is extended or adjusted under 35 U.S.C. 154(b) by 117 days.

(21) Appl. No.: 11/187,126

(22) Filed: Jul. 22, 2005

Related U.S. Application Data

(60) Provisional application No. 60/590,812, filed on Jul. 23, 2004.

(51) Int. Cl.
G06E 1/00 (2006.01)
G06E 3/00 (2006.01)
G06F 15/18 (2006.01)
G06G 7/00 (2006.01)

(52) U.S. Cl. ...................................................... 706/20
(58) Field of Classification Search .................. 706/20; 707/101, 102
See application file for complete search history.

(56) References Cited

U.S. PATENT DOCUMENTS

| | | | | |
|---|---|---|---|---|
| 5,628,003 A | * | 5/1997 | Fujisawa et al. | 707/104.1 |
| 5,675,710 A | * | 10/1997 | Lewis | 706/12 |
| 5,774,357 A | * | 6/1998 | Hoffberg et al. | 713/600 |
| 5,875,108 A | * | 2/1999 | Hoffberg et al. | 700/17 |
| 5,920,477 A | * | 7/1999 | Hoffberg et al. | 382/181 |
| 6,011,537 A | * | 1/2000 | Slotznick | 715/733 |
| 6,044,375 A | * | 3/2000 | Shmueli et al. | 707/101 |
| 6,993,204 B1 | * | 1/2006 | Yahil et al. | 382/265 |
| 7,039,856 B2 | * | 5/2006 | Peairs et al. | 715/500 |
| 7,113,615 B2 | * | 9/2006 | Rhoads et al. | 382/100 |
| 7,136,710 B1 | * | 11/2006 | Hoffberg et al. | 700/83 |
| 7,295,608 B2 | * | 11/2007 | Reynolds et al. | 375/240.01 |

OTHER PUBLICATIONS

Technology 1991: the specialities neural networks, TAPS, integrated document interchange Jurgen, R.K,; Spectrum, IEEE vol. 28, Issue 1, Jan. 1991 pp. 79 Digital Object Identifier 10.1109/6.67249.*

Differentiation and factor analysis on EDI usage data with an artificial neuromolecular system Jong-Chen Chen; Kwoting Fang; Evolutionary Computation, 2001. Proceedings of the 2001 Congress on vol. 2, May 27-30, 2001 pp. 1359-1365 vol. 2 Digital Object Identifier 10.1109/CEC.2001.934349.*

Facial recognition for police purposes using computer graphics and neural networks Starkey, R.B.; Aleksander, I.; Electronic Images and Image Processing in Security and Forensic Science, IEE Colloquium on May 22, 1990 pp. 2/1-2/2.*

(Continued)

Primary Examiner—Michael B. Holmes
(74) Attorney, Agent, or Firm—E. Randall Smith; Junes & Smith, LLP

(57) ABSTRACT

An embodiment of a computer implemented method for determining the disposition of a hyperdocument includes retrieving a hyperdocument from an information source, providing information about content of the hyperdocument to a trained artificial neural network (ANN), the ANN being capable of evaluating the information and providing results reflecting the evaluation, and determining the disposition of the hyperdocument based upon results of the ANN.

9 Claims, 11 Drawing Sheets

OTHER PUBLICATIONS

ACE16K: a 128/spl times/128 focal plane analog processor with digital I/O Linan, G.; Rodriguez-Vazquez, A.; Espejo, S.; Dominguez-Castro, R.; Cellular Neural Networks and Their Applications, 2002. (CNNA 2002). Proceedings of the 2002 7th IEEE International Workshop on Jul. 22-24, 2002 pp. 132-139 Digital Object Identifier 10.1109/CNNA.2002.10.*

A self-organizing map with dynamic architecture for efficient color quantization Kirk, J.S.; Dar-Jen Chang; Zurada, J.M.; Neural Networks, 2001. Proceedings. IJCNN '01. International Joint Conference on vol. 3, Jul. 15-19, 2001 pp. 2128-2132 vol. 3 Digital Object Identifier 10.1109/IJCNN.2001.938495.*

Face detection by color and multilayer feedforward neural network Chiunhsiun Lin; Information Acquisition, 2005 IEEE International Conference on Jun. 27-Jul. 3, 2005 pp. 6 pp. Digital Object Identifier 10.1109/ICIA.2005.1635143.*

Global color image segmentation strategies: Euclidean distance vs. vector angle Wesolkowski, S.; Dony, R.D.; Jemigan, M.E.; Neural Networks for Signal Processing IX, 1999. Proceedings of the 1999 IEEE Signal Processing Society Workshop Aug. 23-25, 1999 pp. 419-428 Digital Object Identifier 10.1109/NNSP.1999.788161.*

Rule extraction from a trained neural network for image keywords extraction Nishiyama, H.; Kawasaki, H.; Fukumi, M.; Akamatsu, N.; Mitsukura, Y.; Fuzzy Information, 2004. Processing NAFIPS '04. IEEE Annual Meeting of the vol. 1, Jun. 27-30, 2004 pp. 325-329 vol. 1 Digital Object Identifier 10.1109/NAFIPS.2004.1336301.*

The Application Study of Apple Color Grading by Particle Swarm Optimization Neural Networks Haiyan Ji; Jinli Yuan; Intelligent Control and Automation, 2006. WCICA 2006. The Sixth World Congress on vol. 1, 2006 pp. 2651-2654 Digital Object Identifier 10.1109/WCICA.2006.1712843.*

A Hardware Architecture for Color Image Enhancement Using a Machine Learning Approach with Adaptive Parameterization Zhang, M.Z.; Ming-Jung Seow; Asari, V.K.; Neural Networks, 2006. IJCNN '06. International Joint Conference on Jul. 16-21, 2006 pp. 35-40.*

FPGA implementation of a neural network for a real-time hand tracking system Krips, M.; Lammert, T.; Kummert, A.; Electronic Design, Test and Applications, 2002. Proceedings. The First IEEE International Workshop on Jan. 29-31, 2002 pp. 313-317 Digital Object Identifier 10.1109/DELTA.2002.994637.*

Detection for triangle traffic sign based on neural network Zhu Shuang-dong; Zhany Yi; Lu Xiao-feng; Vehicular Electronics and Safety, 2005. IEEE International Conference on Oct. 14-16, 2005 pp. 25-28 Digital Object Identifier 10.1109/ICVES.2005.1563608.*

* cited by examiner

| Level | Threshold | Good Accuracy | Bad Accuracy | Rule | | | |
|---|---|---|---|---|---|---|---|
| 10 | 0 | 0 | 0 | 1 | All Images Blocked | | |
| 9 | 0.19 | 0.69 | 0.956 | 0.962667 | Maximize good accuracy in bad range~from: | 0.952667 | to 0.972667 |
| 8 | 0.34 | 0.753 | 0.925 | 0.925333 | Maximize good accuracy in bad range~from: | 0.915333 | to 0.935333 |
| 7 | 0.48 | 0.801 | 0.888 | Maximum Accuracy | | | |
| 6 | 0.6 | 0.838 | 0.835 | Equal Good and Bad Accuracy | | | |
| 5 | 0.72 | 0.881 | 0.747 | 0.865 | Maximize bad accuracy in good range~from: | 0.855 | to 0.875 |
| 4 | 0.77 | 0.901 | 0.699 | 0.892 | Maximize bad accuracy in good range~from: | 0.882 | to 0.902 |
| 3 | 0.81 | 0.919 | 0.635 | 0.919 | Maximize bad accuracy in good range~from: | 0.909 | to 0.929 |
| 2 | 0.85 | 0.95 | 0.451 | 0.946 | Maximize bad accuracy in good range~from: | 0.936 | to 0.956 |
| 1 | 0.9 | 0.976 | 0.251 | 0.973 | Maximize bad accuracy in good range~from: | 0.963 | to 0.983 |
| 0 | 1 | 1 | 1 | 0 | No Images Blocked | | |
| | 0.03733333 | Increments for Bad Accuracy | | | | | |
| | 0.027 | Increments for Good Accuracy | | | | | |

FIG. 15

APPARATUS AND METHODS FOR EVALUATING HYPERDOCUMENTS USING A TRAINED ARTIFICIAL NEURAL NETWORK

This application claims the benefit of U.S. Provisional Patent Application Ser. No. 60/590,812 filed Jul. 23, 2004 and entitled Method For Selective Categorizations Of Content Within Hyperdocuments Using Artificial Neural Networks.

BACKGROUND OF THE INVENTION

The present invention relates to apparatus and methods for evaluating hyperdocuments. More particularly, the present invention relates to apparatus and methods for evaluating hyperdocuments with the use of at least one trained artificial neural network.

Hyperdocuments are retrieved for viewing and/or other use through network connections, file transfers, disk drives or other sources of information. As used in this patent, the term "hyperdocument" means at least one electronically-accessible or readable document, data, image or file, a portion or combination thereof, or a copy thereof. For example, a hyperdocument may be information extractable from a hypertext database or hypermedia system, such as hypertext, images, video, sound, text, or phrases displayed or retrieved as a web page, file, electronic communication or other form of media. A hyperdocument may be a document or web page that includes or points to multiple images, text, video, etc., a compilation of hyperdocument files, a compressed or archived file (e.g. ZIP, TAR, etc.), a document or file that itself is not a hyperdocument (e.g. Microsoft Word documents, Adobe pdf files), but contains one or more hyperdocuments. Often, it is desirable or necessary to evaluate, or review, hyperdocuments for any number of reasons. For example, it may be desirable to evaluate hyperdocuments to determine if they should be provided to one or more users or other destinations for viewing, display, saving, download or another use. For other examples, hyperdocuments are often evaluated for security screening, virus scanning or filtering for, spam or other content. As used in this patent, the term "user" means at least one person, software routine, hardware component, system, designated recipient of a hyperdocument or any other entity or a combination thereof.

Present hyperdocument evaluations systems have various limitations. For example, in the field of hyperdocument filtering, typical existing systems are based upon look-up tables or the like. Some examples of commercially available systems are Norton AntiVirus, Net Nanny and AOL Parental Controls. These systems search the hyperdocument for certain text words or phrases that are compared to text words or phrases maintained in a database. For example, in source comparison systems, the source, address or other identifier of the hyperdocument is typically compared to a list of known sources, addresses or other identifiers. For another example, existing text or html-based language filters must maintain a list of words or phrases to be blocked. Other presently available systems utilize contour transformation, context boundary analysis, templates for categorizing specific hypertext and pixel comparisons for color images. An example of existing image comparison software is ScreenShield by Guardware, Inc., which compares hyperdocument pixel color to a skin tones database.

The ability of typical existing systems to evaluate hyperdocuments is thus limited to the text, phrases, images or other data entered into and maintained in a database. To stay current, the lists must be updated for changing sources or sites, new sources or data, etc. Known systems utilizing contour transformations or boundary analysis are limited to specific criteria previously established for the system.

It should be understood, however, that the above discussion is only exemplary of existing technology and its limitations. The existing technology has other limitations. Further, each embodiment of the present invention and each claim of this patent does not necessarily address or solve the above-described or any particular limitations or disadvantages of existing technology and is otherwise not limited in any way by the above discussion.

Accordingly, there exists a need for apparatus and methods for evaluating hyperdocuments having one or more of the following attributes, capabilities or features: uses trained artificial neural network technology for hyperdocument evaluation; uses trained artificial neural network technology for evaluation of images; uses trained artificial neural network technology for evaluation of pornographic content in hyperdocuments; transforms electronic image data into a format useful by an artificial neural network for hyperdocument analysis; evaluates and selectively categories hyperdocuments based upon artificial neural network analysis; allows for selective categorizations of content within hyperdocuments; evaluates the accuracy of hyperdocument retrieval; allows hyperdocument retrieval based upon a sliding scale associated with specific criteria; selectively allows retrieval of information from within hyperdocuments; provides hyperdocument retrieval control based upon the categorization of the hyperdocument or content within; allows user-selected criteria for hyperdocument retrieval; provides flexibility in hyperdocument retrieval; categorizes the hyperdocuments, such as images, rather than merely inspecting text or phrases; evaluates the actual hyperdocument content, not merely its address, description or reference; is not limited to a comparison list or database; does not rely upon maintenance of a comparison list or database; does not depend on the selection criteria imposed by the system; includes a timeout function; or any combination thereof.

BRIEF SUMMARY OF THE INVENTION

Various embodiments of the present invention involve a computer-implemented method for determining the disposition of a hyperdocument. The method includes retrieving a hyperdocument from an information source and providing information about content of the hyperdocument to a trained artificial neural network. The trained artificial neural network is capable of evaluating the information and providing results reflecting the evaluation. The disposition of the hyperdocument is determined based upon results of the trained artificial neural network.

If desired, the results of the artificial neural network evaluation may be compared to at least one user-designated selection criteria. The method may include categorizing the hyperdocument into one among multiple categories based upon the evaluation of the artificial neural network. The category level of the artificial neural network results may be compared with a desired category level.

In some embodiment, the invention involves a computer-implemented method for evaluating hyperdocument images, including retrieving a hyperdocument from an information source based upon a request from a requesting application. Information about one or more images of the hyperdocument is provided to a trained artificial neural network, the trained artificial neural network being capable of evaluating the information and providing results reflecting the evaluation. The disposition of the hyperdocument image(s) is determined based upon results of the trained artificial neural network, such disposition including at least one among modifying the hyperdocument and providing the modified hyperdocument to the requesting application or other destination, providing the original hyperdocument to the requesting application or other destination and providing a replacement hyperdocument to the requesting application or other destination.

There are embodiments of the present invention involve a computer-implemented method for filtering content of a hyperdocument that includes a user selecting criteria for allowable hyperdocuments. A hyperdocument is received from an information source based upon a request from a requesting application. Information about content of the hyperdocument is provided to a trained artificial neural network, the trained artificial neural network being capable of analyzing the information and providing results reflecting the analysis. Based upon the artificial neural network results, hyperdocument is provided to the requesting application if it matches the user selected criteria.

Accordingly, the present invention includes features and advantages which are believed to enable it to advance hyperdocument evaluation technology. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

For a detailed description of preferred embodiments of the invention, reference will now be made to the accompanying drawings wherein:

FIG. 15 is a chart showing example accuracy data and threshold values for example hyperdocument analysis category levels used in connection with an embodiment of a hyperdocument evaluation system in accordance with the present invention;

DETAILED DESCRIPTION OF PRESENTLY PREFERRED EMBODIMENTS OF THE INVENTION

Figure 1:
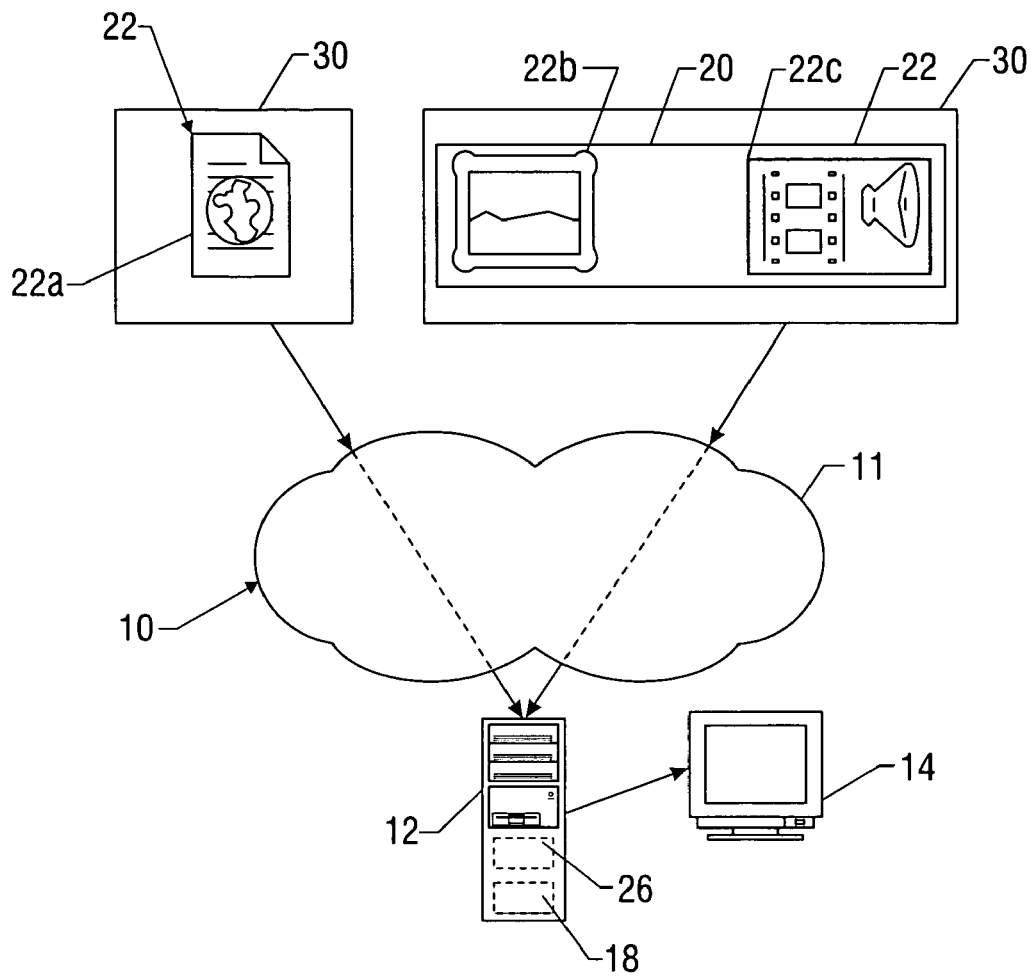
FIG. 1 is a system diagram including an embodiment of a hyperdocument evaluation system in accordance with the present invention.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

It should be understood that the contents of this patent and the appended Figures are not intended and should not be deemed to limit the scope or construction of any of the appended claims or claim language. Furthermore, as used herein and throughout the various portions of this patent specification, the terms "invention", "present invention" and variations thereof are not intended to mean the claimed invention of any particular of the appended claim or claims, or all of the appended claims. Instead, these terms should be construed to refer merely to a possible embodiment of the present invention. Thus, the use herein of the terms "invention", "present invention" and variations thereof should not limit the construction or scope of the appended claims.

FIG. 1 is a system diagram showing a network 10 including an embodiment of a hyperdocument evaluation system ("HES") 18 in accordance with the present invention. The exemplary HES 18 is in communication with at least one requesting application 26 and is coupled to the network 10. For example the HES 18 and requesting application 26 may be computer software located on a data retrieval device, such as a computer 12. As used throughout this patent, the term "computer" and variations thereof means a machine or device that can follow instructions to alter data in a desirable way to perform at least some operations without human intervention. Hyperdocuments 22 (or copies thereof) located at one or more information sources 30 are accessible to the HES 18 or requesting application via the network 10.

The illustrated network 10 is the Internet or World Wide Web 11, the structure and operation of which is generally known. However, the HES 18 of the present invention is not limited to use over the Internet, but may be used in connection with any other communication or data exchange system capable of allowing the HES 18 access to hyperdocuments 22 or copies thereof. Some examples of other types of suitable networks are large area networks, wide area networks, value-added networks and TCP/IP networks. For another example, the computer 12 of FIG. 1 may be a television set that scans video data (e.g. video multimedia data 22c), from a broadcast source 30, such as a television station or cable provider, along a broadcast route 10, such as airwaves or a cable network. Alternately, the HES 18 need not be used over a network, such as when the hyperdocument is available to the HES 18 on a private network, local drive or media storage device.

Generally, information sources may be any locations accessible by the HES 18 or requesting application 26, such as databases, files, directories and file transfer or information storage devices. The information sources 30 of the example of FIG. 1 may be any location accessible over the network 10, such as electronic files stored on a PC or server (not shown).

Some examples of hyperdocuments 22 that may be provided over the network 10 in FIG. 1 are web pages 22a and files 20 that contain multiple hyperdocuments 22 (e.g. graphics files 22b and multimedia file 22c). The requesting application 26 may be any suitable information retrieval system, software, hardware or other mechanism capable of requesting a hyperdocument 22 and with which the HES 18 may communicate. In the example shown, the requesting application 26 is web browser software running on the computer 12. However, it should be understood that the present invention is not limited by the type, format, functionality or other characteristic of the hyperdocument, information source or requesting application.

The HES 18 may take any form of any combination of software and/or hardware capable of evaluating hyperdocuments with the use of one or more trained artificial neural networks and communicating with one or more requesting applications 26, and may be at any desired physical location or locations. As used throughout this patent, the designation "ANN" means at least one trained artificial neural network. For example, the HES may be software residing on a content server coupled with a web server, numerous servers, a PC in communication with a server, a computer running browser software coupled to the network 10 via a wide area network, a mainframe computer, a network device, a personal data assistant, a laptop computer, a hand-held device coupled to the network 10 via a wireless network, a point of presence (POP) device, a network-enabled telephone, an interactive or network-enabled television or any other suitable device(s) as is or becomes known, or a combination thereof. If desired, the HES 18 may be allocated, such as at one or more nodes (not shown), distributed on an intelligent network or any other suitable configuration. Depending upon the particular deployment of the HES 18, the overall communication link character connection topology and other communication link characteristics may differ.

The HES 18 or components thereof may be built into the requesting application 26 or an add-on to the requesting application 26, electronically transmittable, such as by download over the network 10, embedded on a diskette (not shown), CD (not shown), magnetic tape (not shown) or any other suitable media. It should be understood, however, that the present invention is not limited in any way by the above examples of formats, locations and configurations of the HES 18.

Still referring to FIG. 1, in accordance with an embodiment of a method of the present invention, a hyperdocument 22 requested by the requesting application 26 is provided to the HES 18 from an information source 30 via the network 10. Using an ANN, the HES 18 evaluates at least some of the content of the hyperdocument 22 to determine whether such content should be provided to the requesting application 26 (such as for display on a monitor 14), or any other desired destination(s). Based upon evaluation of the hyperdocument 22 by the HES 18, the hyperdocument 22 is disposed of accordingly. Some examples of possible "disposition actions", depending upon the particular embodiment and circumstances, are (i) providing the hyperdocument 22 in its original form, (ii) providing the hyperdocument 22 in a modified form, (iii) replacing all or part of the hyperdocument, (iv) not providing the hyperdocument, or multiple such actions depending upon the designated recipient(s).

Figure 2:
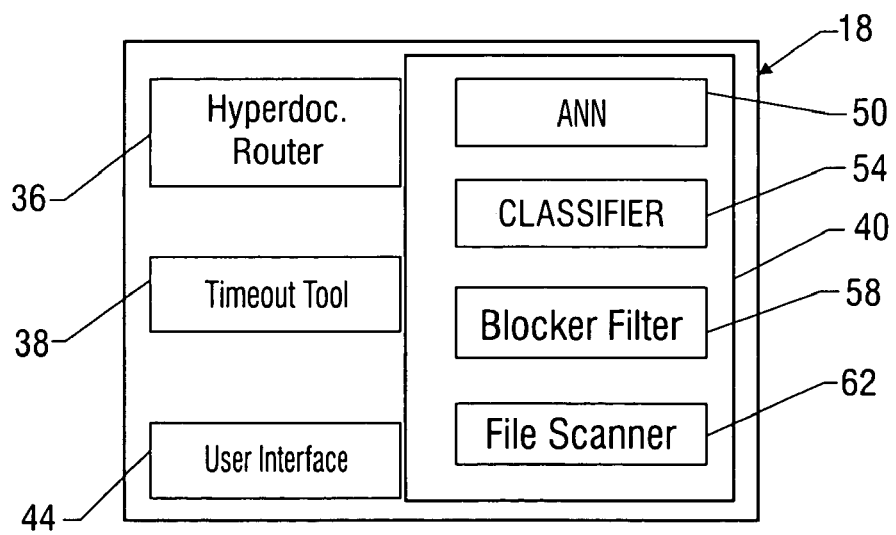
FIG. 2 is a block diagram illustrating various components of an embodiment of a hyperdocument evaluation system in accordance with the present invention.

Now referring to FIG. 2, the HES 18 may include any desired component or components. In the example shown, the HES includes a hyperdocument routing tool 36, timeout tool 38, content analysis system 40 and user interface 44. The illustrated content analysis system 40 includes an ANN 50, classifier 54, blocker filter 58 and file scanner 62. However, except for the ANN 50, these components are neither required for every embodiment nor limiting upon the present invention.

Figure 3:
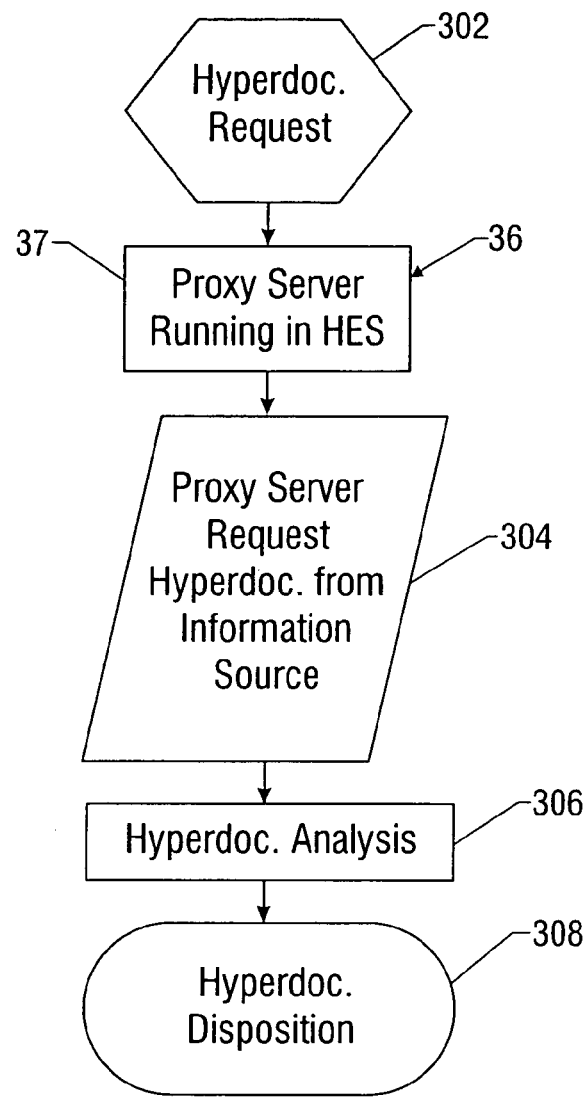
FIG. 3 is a flow diagram illustrating the process performed by an embodiment of a hyperdocument evaluation system that uses a proxy server in accordance with the present invention.

When included, the hyperdocument routing tool, or router, 36 may have any suitable desirable format and functionality as is or becomes known. In the embodiment of FIG. 3, the router 36 is a proxy server 37, which, if desired, may be any suitable commercially available proxy server. The exemplary proxy server 37 is software that receives a network address, URL or other source location address of a hyperdocument from a requesting application (Step 302). In Step 304, the proxy server 37 requests the hyperdocument from the Internet or other information source. After the proxy server 37 receives the hyperdocument, it passes the hyperdocument to the content analysis system for evaluation (Step 306), and routes the hyperdocument for disposition after such evaluation (Step 308).

Figure 4:
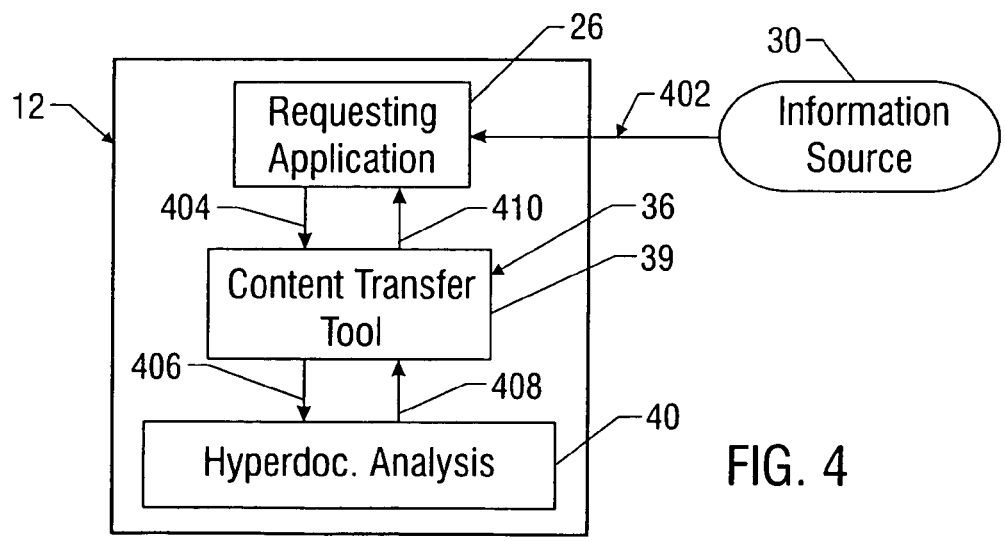
FIG. 4 is a flow diagram illustrating the process performed by an embodiment of a hyperdocument evaluation system that uses a content transfer tool in accordance with the present invention.

In the embodiment of FIG. 4, the hyperdocument router 36 is a content transfer tool 39. In this example, the content transfer tool 39 is software that is a direct plug-in to the requesting application 26, such as a web browser, which is located on an electronic device, such as a computer 12, along with the HES 18. The content transfer tool 39 may, if desired, be any suitable media filter, image filter, MIME-type filter or the like, which is or may be commercially available. In Step 402, the requesting application 26 receives a hyperdocument from one or more information sources 30 as the result of a network request (such as for a URL), file transfer, copy or other form of information retrieval procedure. The requesting application 26 passes content of the hyperdocument to the content transfer tool 39 (Step 404). The content transfer tool 39 then passes such content to the content analysis system 40 of the HES 18, which is already running on the computer 12 (Step 406). After the content analysis system 40 evaluates the content and passes the content back to the content transfer tool (Step 408), the content transfer tool 39 disposes of the original or modified hyperdocument appropriately. For example, the content transfer tool 39 may send the original or modified hyperdocument back to the requesting application 26 (Step 410). In other embodiments, the content transfer tool 39 may not be part of HES 18, but could instead be initiated by the requesting application 26 as a shared object and communicate with the HES by invoking methods on the shared object.

The timeout tool 38, if included, is used to temporarily stop the evaluation of hyperdocuments by the HES 18. When the timeout tool 38 is activated, hyperdocuments requested by the requesting application 26 are not evaluated by the HES 18 and are provided to the desired recipient(s) unchanged. The timeout tool 38 may have any desired capabilities and format. For example, referring to FIG. 5, an embodiment of a timeout user interface 68 for an exemplary timeout tool of a presently commercially available HES 18 known as the Photo No-No™ system Version 1.4 (referred to herein as "Photo No-No"), is shown. Publicly available written materials relating to Photo No-No, a pornographic image filter, including the web screens and information available at www.photonono.com are hereby incorporated herein by reference in their entireties.

Figure 5:
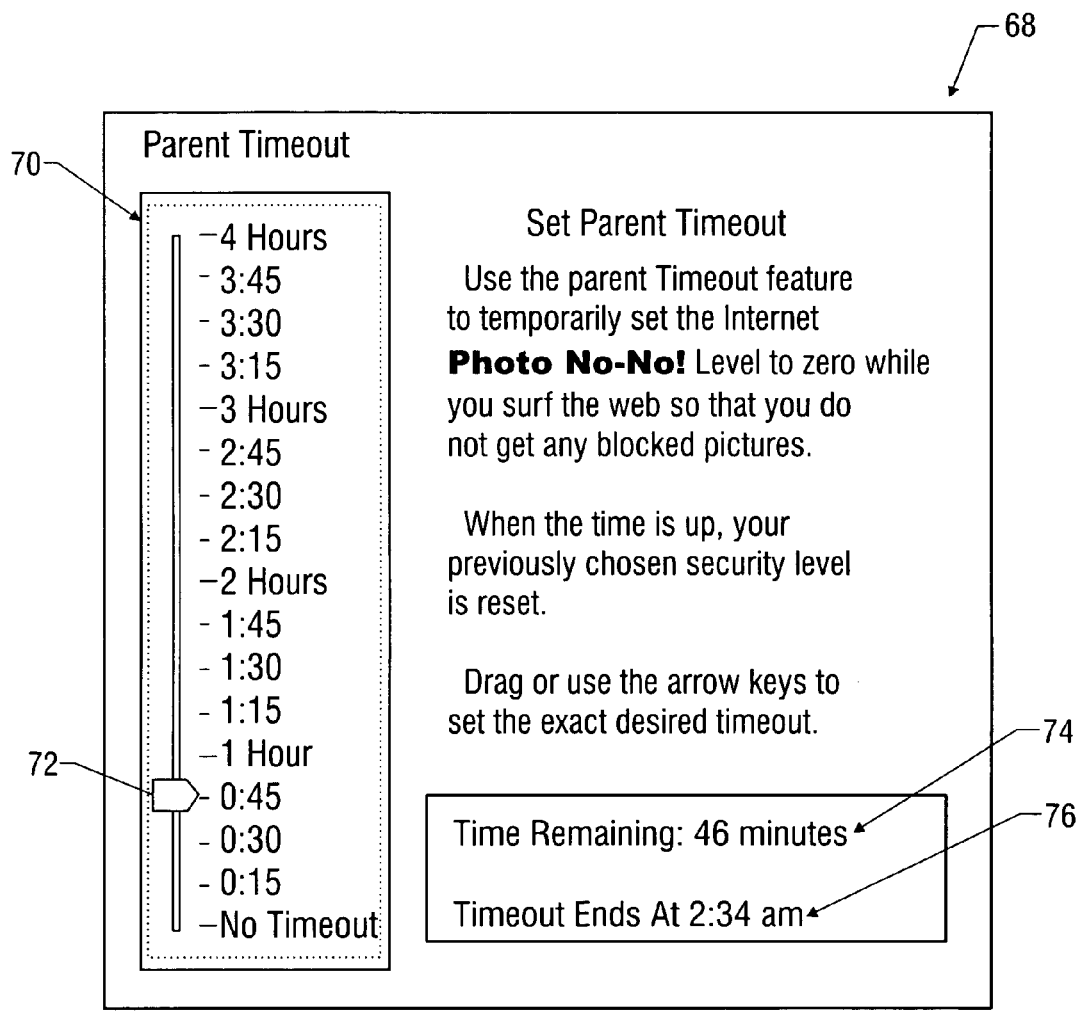
FIG. 5 is an embodiment of a timeout tool user interface useful with an embodiment of a hyperdocument evaluation system in accordance with the present invention.

Still referring to FIG. 5, the interface 68 includes a timeout clock controller 70. The illustrated timeout clock controller 70 may be user-set and changed by dragging a timeout pointer 72 or with the use of arrow keys on a keyboard or keypad associated with the interface 68. The pointer 72 is thus set by the user to establish the duration of the timeout period, which automatically starts the timeout clock. Thereafter, the pointer 72 automatically moves down the illustrated face of the controller 70 to the bottom, when the timeout ends. A corresponding time remaining indicator 74 displays the same information as the controller 70 (the amount of time remaining in the timeout) and similarly changes in real time. A timeout end time indicator 76 displays the actual end time of the timeout session. At any time, even during a timeout, the user can move the pointer 72 to reset the timeout, which automatically adjusts the time remaining indicator 74 and timeout end time indicator 76. When the timeout period ends, the HES 18 automatically resumes hyperdocument evaluation for future requests by the requesting application 26.

The blocker filter 58 may have any desired form, format and capabilities and operate as is or becomes known. The exemplary blocker filter is software and may be any suitable commercially available blocker filter. When activated, the blocker filter 58 compares an incoming hyperdocument's source location to a list of disallowed information sources, addresses or other identifying indicia. In the present embodiment, the blocker filter 58 uses fast lookup methods for comparing the hyperdocument source location and subsets of that location (such as a URL specific location) to an "Always Block" list.

Figure 6:
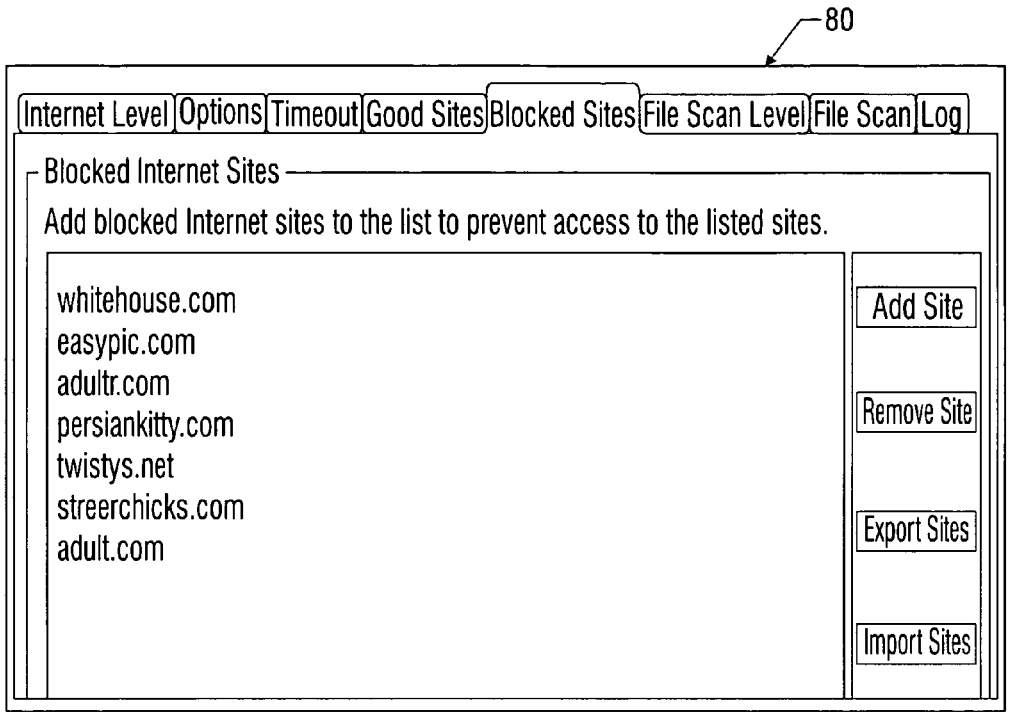
FIG. 6 is an embodiment of a blocker filter user interface useful with an embodiment of a hyperdocument evaluation system in accordance with the present invention.

FIG. 6 shows an example blocker filter user interface 80 relating to an "Always Block" list. If a match is found, an appropriate disposition action takes place, such as the requesting application (or other designated destination(s)) being provided with a hyperdocument that is entirely or partially replaced with designated data. For example, the following text could be displayed when the user attempts to access a blocked hyperdocument:

Photo No-No! Blocked Site

The site http://www.whitehouse.com/ was blocked by Photo No-No!

In this embodiment, if the hyperdocument's source location is not on the "Always Block" list, the hyperdocument is passed to another component of the HES 18 for further analysis or evaluation.

If desired, the blocker filter 58 may also or instead compare the incoming hyperdocument's source location to a list of allowed information sources, addresses or other identifying indicia. This operation would be similar to the operation described above with respect to the "Always Block" list, except the list would be an "Always Allow" list and the opposite actions as those described above upon would occur.

Figure 7:
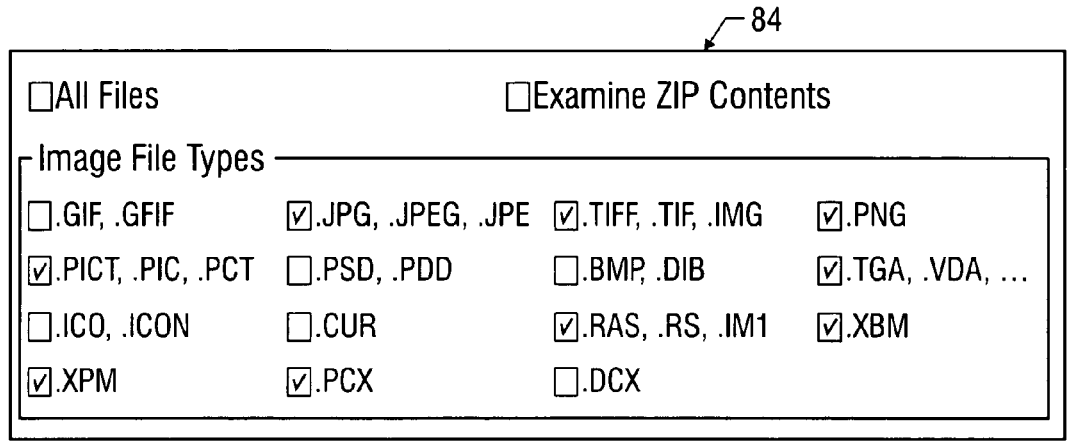
FIG. 7 is an embodiment of a hyperdocument type selection user interface useful with an embodiment of a hyperdocument evaluation system in accordance with the present invention.
Figure 8:
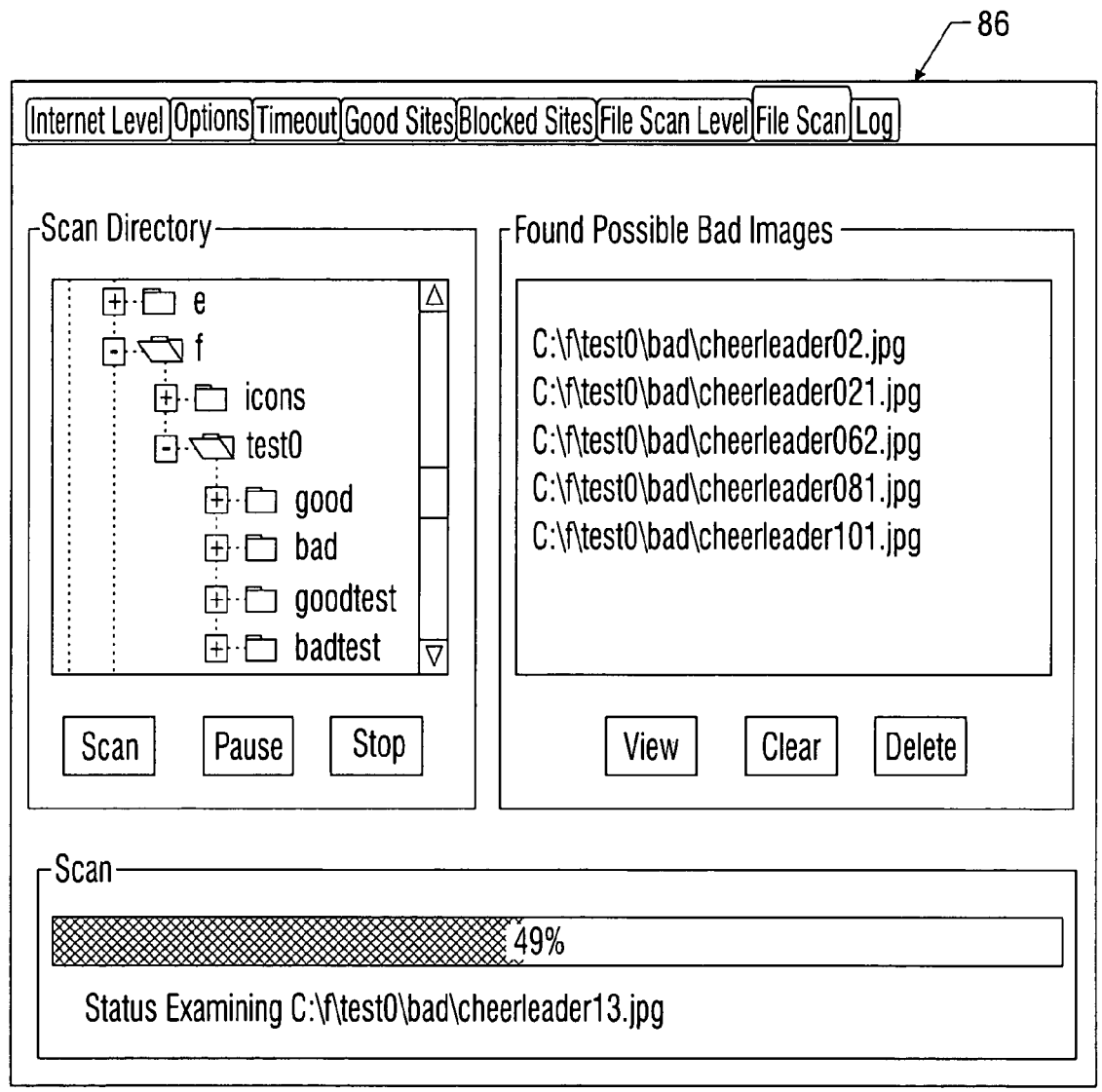
FIG. 8 is an embodiment of a file scanner user interface useful with an embodiment of a hyperdocument evaluation system in accordance with the present invention.

The file scanner 62, when included, may have any desired form, format and capabilities and operate as is or becomes known, and may be any suitable commercially available file scanner. The exemplary file scanner 62 is software which, when activated, scans a selected disk, directory, or other information source of data for hyperdocuments that are of a type designated by the user for evaluation by the HES 18. (FIG. 7 shows an example hyperdocument type selection user interface 84 for use in evaluating image-type hyperdocuments. In such example, the user can select what types of images are to be evaluated.) For each file in the designated source location having one or more hyperdocuments of a designated type, the hyperdocuments are evaluated by the HES 18. If desired, the results of the HES evaluation may be shown or saved. For example, FIG. 8 illustrates an example file scanner user interface 86. If an option to request file scan logging is provided and selected, the file scanner 62 logs the desired information (e.g. file name, location and other properties). Note that the file may be a compilation of hyperdocument files, such as a compressed or archived file (e.g. ZIP, TAR, etc.) and may not be a hyperdocument itself (e.g. Microsoft Word document or Adobe pdf file) but which contains one or more hyperdocuments.

Figure 10:
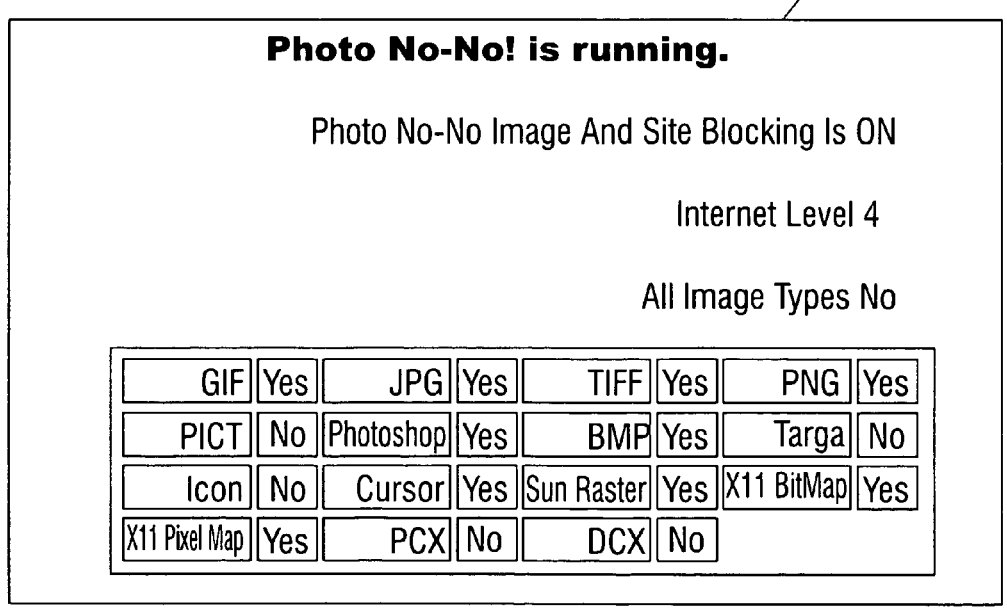
FIG. 10 is an embodiment of a summary page screen display useful with an embodiment of a hyperdocument evaluation system in accordance with the present invention.
Figure 9:
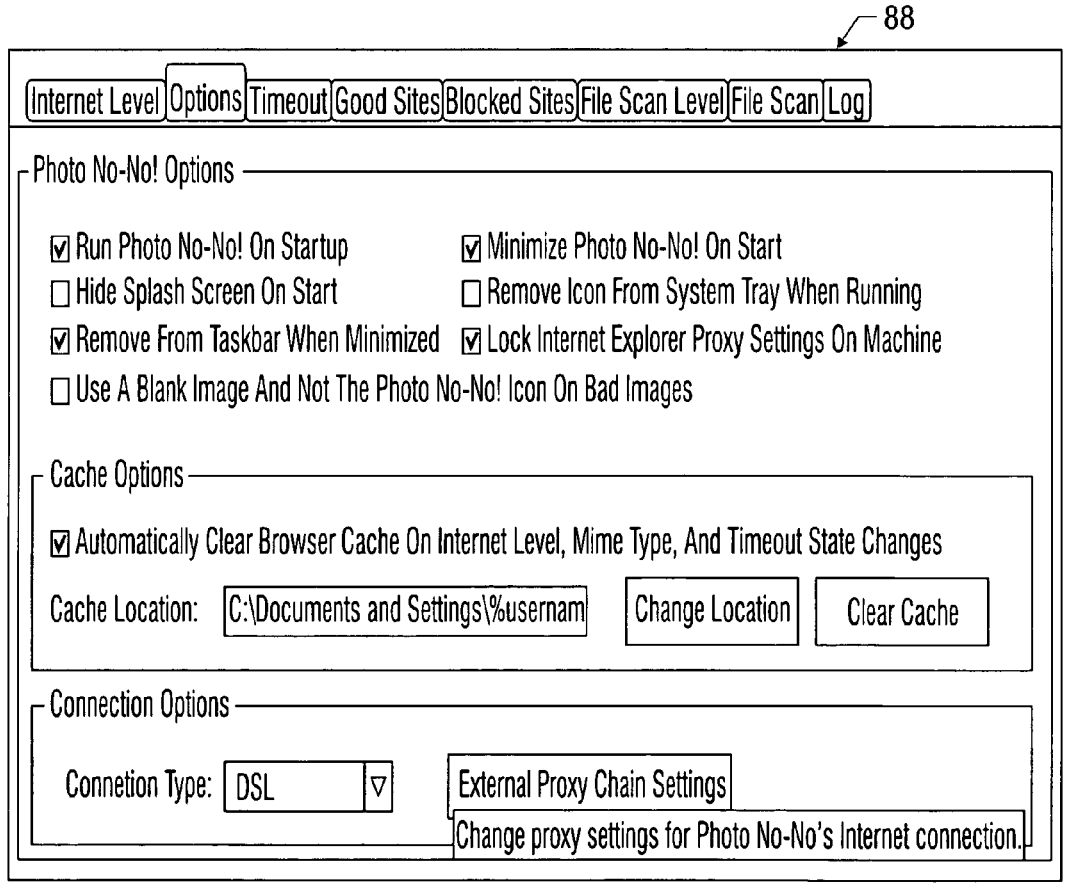
FIG. 9 is an embodiment of a user options user interface useful with an embodiment of a hyperdocument evaluation system in accordance with the present invention.

When included, the user interface 44 may have any suitable format, capabilities and functionality. For example, the user interface 44 may be at least one graphical user interface or command line interface for user-guided management of the HES 18 and/or for providing information. Example user-guided preferences are settings for the setup and operation of aforementioned and below described components. FIGS. 5-10 and 14 herein provide examples of possible user interfaces 44. (FIG. 9 provides an example of a user interface options screen 88 and FIG. 10 provides a summary page 90.)

The classifier 54, when included, may serve any desired functions. In the present embodiment, the classifier 54 interacts with the ANN 50. For example, the classifier 54 may screen the requested hyperdocument based words, phrases, images or other types of information. In the illustrated embodiment, the classifier 54 determines whether the requested hyperdocument is of a type designated for evaluation by the HES 18 (See FIG. 7). Depending upon the input requirements of the ANN 50, the classifier 54 may format or modify the hyperdocument for review by the ANN 50, or generate necessary input data for the ANN 50. For example, the illustrated classifier 54 is capable of converting hyperdocument image data into input values for the ANN by scaling, color analysis and/or ordering. The classifier 54 may also receive the output of the ANN, and based thereupon, determine the ultimate disposition of the hyperdocument and/or communicate with other components of the HES 18.

Figure 11:
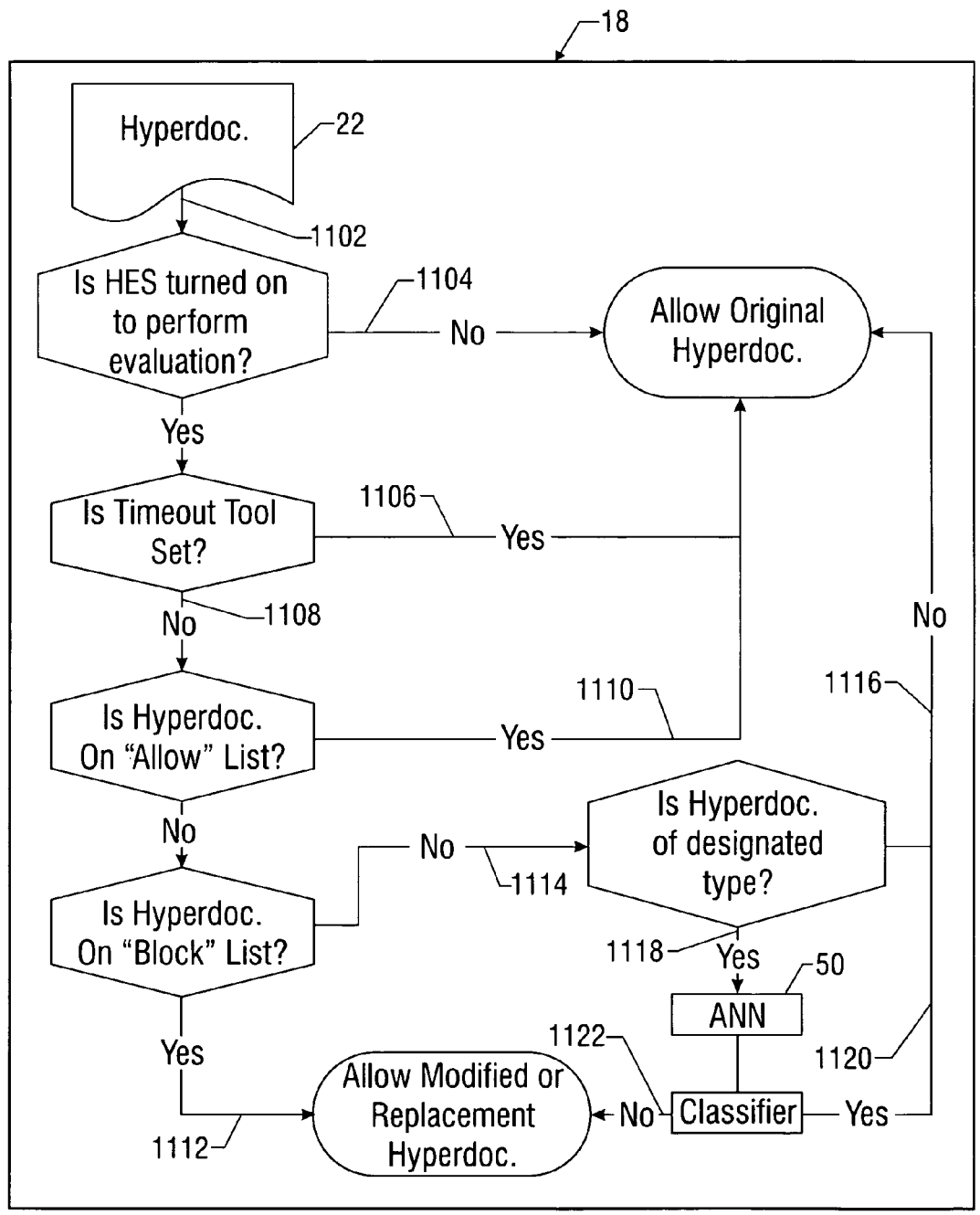
FIG. 11 is a flow diagram illustrating the process performed by an embodiment of a hyperdocument evaluation system in accordance with the present invention.

Now referring to FIG. 11, an embodiment of a method of operation of a HES 18 in accordance with the present invention is shown. In Step 1102, a hyperdocument 22 is provided to the HES 18. If the HES 18 is "off" (Step 1104) or a timeout tool has been activated (Step 1106), then the original hyperdocument is allowed to the designated recipient(s) unchanged. If the timeout tool is not set, the hyperdocument is passed to a blocker filter (Step 1108). If the hyperdocument is found on an "Always Allow" list, then the original hyperdocument is allowed to the designated recipient(s) unchanged (Step 1110). If the hyperdocument is found on an "Always Block" list, a modified or replacement hyperdocument, no hyperdocument or other data (as desired) is provided to the designated recipient(s) (Step 1112).

Still referring to FIG. 11, if the hyperdocument is not on either list, the hyperdocument is passed to the classifier 54 (Step 1114) for determination of whether it is of a type designated for evaluation (See FIG. 7). If not, the original hyperdocument is allowed to the designated recipient(s) unchanged (Step 1116). If the hyperdocument is of a type designated to be evaluated, the appropriate data is provided to the ANN 50 for analysis of the hyperdocument (Step 1118). The output of the ANN 50 is provided back to the classifier 54 for determination of the disposition action to be taken (Steps 1120, 1122).

The HES 18 evaluates hyperdocuments in any manner, for any purpose and with any criteria as desired. For example, the HES may be designed to determine if a hyperdocument should be sent to one or more recipients based upon criteria assigned to each recipient. For another example, the HES may be designed to determine whether content of the hyperdocument is allowable for viewing by one or more recipients. In some embodiments, the hyperdocument or its content may be graded and categorized among multiple categories or based on specific criteria, upon which the final decision of whether and what to allow is based. The selection criteria, which, if desired, could be set by a user, may be based upon words, phrases, images and/or other types of information in the hyperdocument or the nature of content in the hyperdocument.

Figure 12:
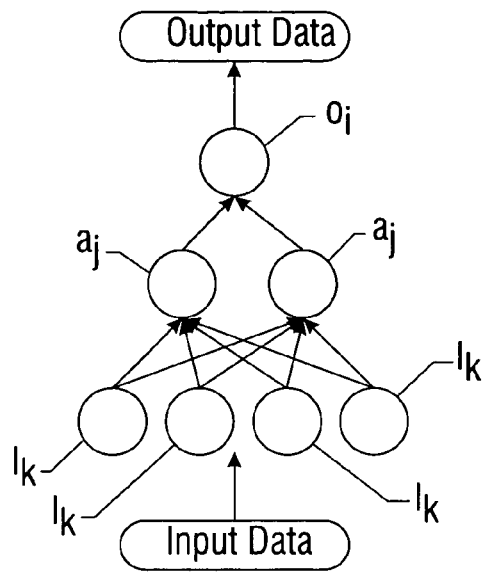
FIG. 12 is a flow diagram illustrating the general flow of data through an example feed-forward type artificial neural network.

The HES 18 of the present invention utilizes one or more trained artificial neural networks to assist in evaluating hyperdocuments. For background purposes, generally, an artificial neural network may be used to derive meaning from complicated data and be used to formulate or extract patterns and trends that may be highly complicated. An artificial neural network learns by example, wherein example data is used to train the artificial neural network by adjusting the weights of data importance into each neuron or node of the artificial neural network. An example artificial neural network is displayed in FIG. 12. This artificial neural network includes an input layer of four nodes $I_k$, one hidden layer of two nodes $a_j$ and an output layer $O_i$ of a single node. Input layers are layers of nodes $I_k$ that take input data, process and send it to the hidden layer. Output nodes $O_i$ take data from input nodes or hidden nodes, process the data and send output data. Hidden layers are groups of hidden nodes $a_j$ that process data internally. The hidden nodes do not receive input data and do not send output data. In this example, connections between the layers of nodes are allowed in only one direction (e.g. from the input layer to the next layer and so on), which is sometimes referred to as "feed-forward."

Data in this example artificial neural network is expressed as double precision floating point numbers. The data from a hidden or output node of this artificial neural network is referred to as the node's activation function, which relates to the data it receives and the weight, or importance, of such data. One example activation function is the sigmoid function expressed as:

$$a_j=1/(1+e^{-x}) \text{ where } x=\Sigma_k W_{kj}*I_k \text{ and } k=1 \ldots n$$

Given a set of inputs, this sigmoid activation function will produce a non-linear output distribution between 0 and 1.

Training an artificial neural network can be performed by various methods in order to compute the weights ($W_{kj}$) of the hidden nodes, and the weights ($W_{ji}$) of the output nodes. In the back propagation method, for example, the output of the artificial neural network is compared to the desired output of the artificial neural network. The weight of each input to hidden node and weight of each hidden to output node may be updated in an amount proportional to the error at that node multiplied by the output of the node that is feeding into the weight so that the artificial neural network better represents the overall accuracy of the artificial neural network.

An example application of an artificial neural network is pattern recognition. Pattern recognition can be implemented using a feed-forward artificial neural network and training it on example data containing the patterns that will be recognized. This training process causes the artificial neural network to associate output values with input patterns. When data is feed into the artificial neural network, the artificial neural network tries to identify the input pattern and provide the associated output value for that input pattern. When input data not associated with a previously trained pattern is fed into the artificial neural network, the artificial neural network produces an output value that corresponds to the trained input pattern category value that is the closest match. The overall accuracy of the artificial neural network can be expressed in terms of it accuracy in matching input patterns with the desired output value. Hidden layers add to the overall accuracy of the artificial neural network by learning to provide a representation for the input data. More hidden nodes and hidden layers increases accuracy to a given point by increasing the number of representations for the input data. It should be noted that the above discussion of artificial neural networks is provided for background purposes only and should not be limiting upon the present invention or appended claims.

In accordance with the present invention, at least one ANN 50 analyzes the hyperdocument(s) 22 being evaluated by the HES 18. In the illustrated embodiment, the HES 18 includes an ANN 50 trained for analysis of hyperdocuments that are electronic images. In this embodiment, the ANN 50 is a feed-forward artificial neural network having three layers with 16,384 input nodes, a single hidden layer having 64 hidden nodes and one output node. The activation function used in this ANN 50 is the sigmoid activation function mentioned above and the inputs and outputs of this ANN are represented by double precision floating point value numbers.

Figure 13:
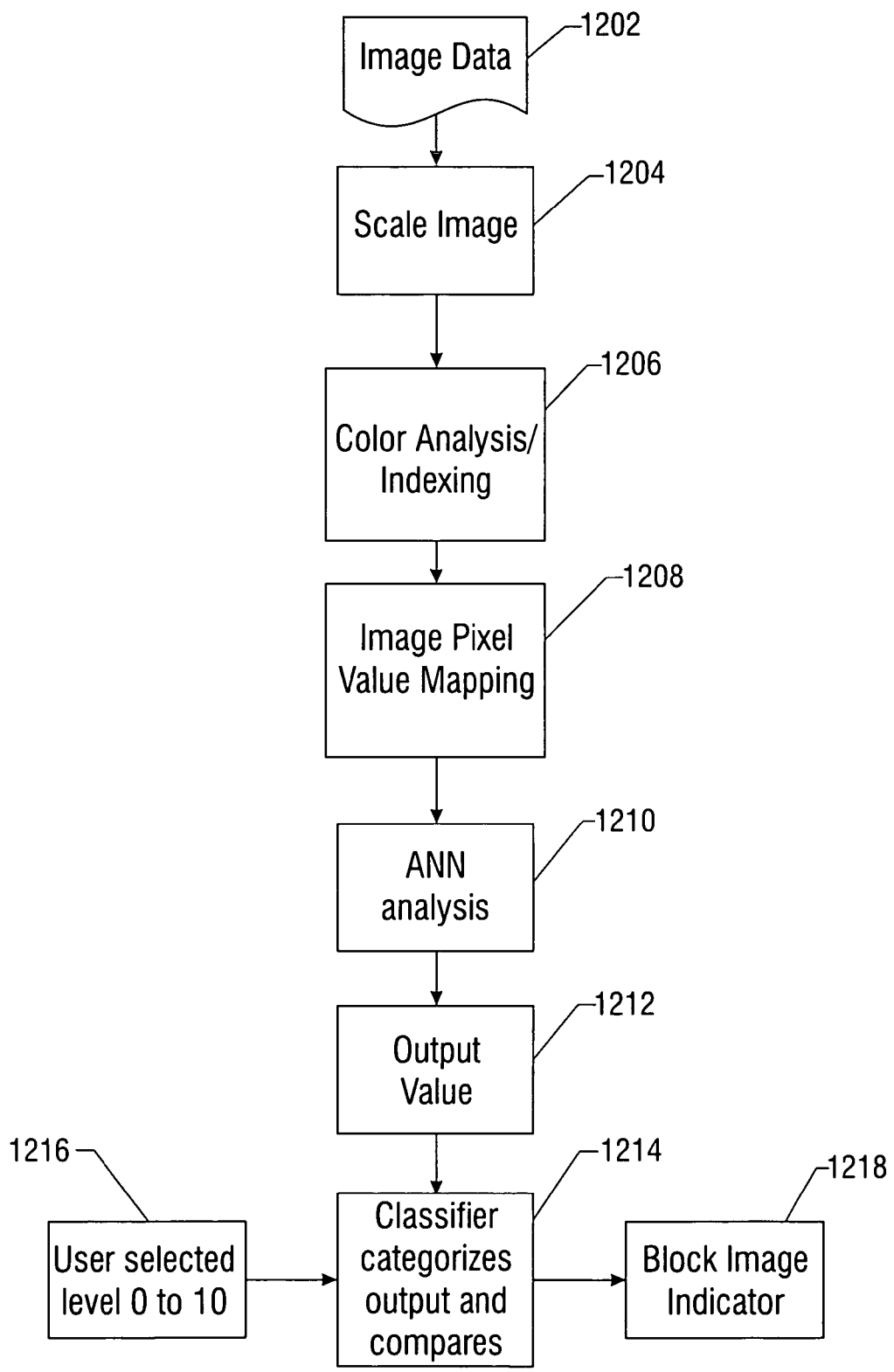
FIG. 13 is a flow diagram illustrating the process performed by an embodiment of a hyperdocument evaluation system that uses an embodiment of a classifier in accordance with the present invention.

Referring to FIG. 13, in this embodiment, each hyperdocument image is provided to the HES 18 as a bitmap of image data with color values for each pixel (Step 1202). Images analyzed by this ANN 50 must be 128 pixels×128 pixels. The 128×128 dimension has 16,384 pixels, the same as the number of input nodes in the ANN 50. Thus, one pixel value represents a single input node of the ANN 50. The images may be scaled to this size using any suitable technique. For example, images may be scaled by the classifier 54 to the 128×128 pixel size using the standard averaging scaling technique (Step 1204).

Also for this embodiment, the pixel color values for the image are converted into a double precision floating point value by the classifier 54 for input into the ANN 50 (Step 1206). Any suitable technique may be used for such color analysis and indexing. For example, when the pixel color value is provided as individual color values for Red, Green, and Blue (RGB value) with a byte (0 to 255) of data for each color (16,581,375 different colors are possible), each pixel's RGB value may be indexed into a smaller set of known colors then divided by the size of the set. The result is a decimal value number, which will serve as the double precision floating point value for that pixel. For example, the standard Super Video Graphics Adapter (SVGA) color palette may be used. This color set includes 256 color values equally distributed across the 16,581,375 RGB color value spectrum. A standard color dither may be used to map the RGB value of a pixel to a SVGA color by determining the closest color match. Once the color in the SVGA color set is determined, the index into the SVGA color set is provided as a value from 0 to 255. That value is then divided by 256 to compute a double precision floating point value for that pixel.

Still referring to the embodiment of FIG. 13, the classifier 54 of this example maps all the pixels of the image to the 16,384 input nodes of the ANN 50 by row first ordering (Step 1208). Thus, the double precision floating point value for each pixel is used as an input node of the ANN 50. Accordingly, there are 16,384 input nodes denoted by $I_k$, where k is between 1 and 16,384. The ANN 50 of this embodiment then takes each input node's value and propagates it through the hidden layer (each hidden node) and the output layer (Step 1210). In the present Photo No-No embodiment, based upon its own criteria, each hidden node analyzes all incoming pixel values to determine whether the image is "good" or "bad" and sends an appropriate value to the output layer. The output layer performs a similar analysis. These analyses involve variables relating to whether and to what extent the image has pornographic subject matter. Example variables are the inclusion, location and grouping of colors.

The value of each hidden node, denoted by $a_j$, where j is 1 to 64, is calculated using the sigmoid activation function:

$$a_j=1/(1+e^{-x}) \text{ where } x=\Sigma_k W_{kj}*I_k \text{ and } k=1 \ldots 16,384$$

Then, the value of the output node, $O_1$, is calculated (Step 1212) using the sigmoid activation function:

$$O_1 = 1/(1+e^{-x}) \text{ where } x = \Sigma_j W_{ji} * a_j \text{ and } j=1 \ldots 64$$

Each output value $O_1$ of this ANN 50 is a double precision floating point value.

Still referring to FIG. 13, in this embodiment, the classifier 54 receives the output value of the ANN 50 and classifies it into one of eleven categories denoted as categories 0 to 10 (Step 1214) based upon the likelihood the image has pornographic content. To associate an output value of the ANN 50 with a category among 0-10, the ANN output value serves as a probability that the image is either "good" or "bad." A "good" (most desirable) image has an output value closer to 0 and a "bad" (least desirable) image has an output value closer to 1. Thus, category "0" includes images deemed by the ANN 50 to be least likely to include any pornographic content while category "10" would include images deemed by the ANN 50 to be most likely to include pornographic content, with the middle categories 1-9 scaled therebetween. The closer an image's category is to "10", the more likely the image has pornographic content. In this example, the user can choose to view hyperdocuments in any such category. The classifier 54 of this example compares such category level (Step 1214) to a user-selected desired category among 0 to 10 (Step 1216), thereafter indicating whether or not the image should be blocked (Step 1218).

Figure 14:
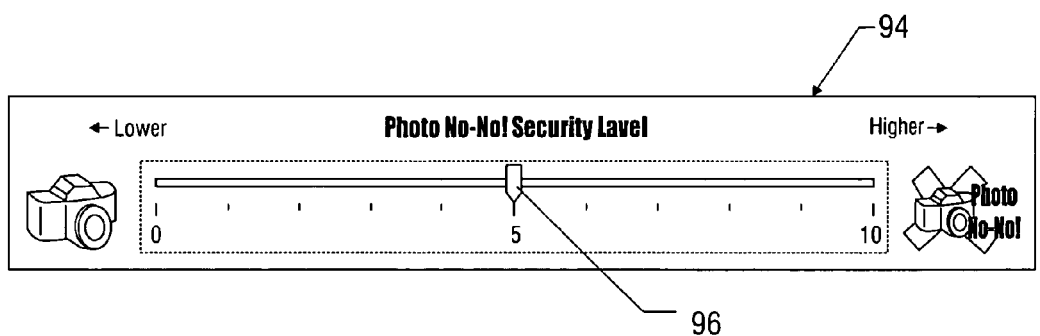
FIG. 14 is an embodiment of a category selection user interface useful with an embodiment of a hyperdocument evaluation system in accordance with the present invention.

An example category selection user interface 94 is shown in FIG. 14. This interface includes a category pointer 96 movable by a user between category settings 0, 1, 2, 3 . . . 10. These settings represent the desired level of screening pornographic material from hyperdocument images to be allowed on the same scale as mentioned above.

The exemplary classifier 54 then signals the content analysis system 40 with the command "yes block" or "no do not block". The content analysis system 40 will modify, replace or not modify the hyperdocument and take the desired disposition action, such as sending the hyperdocument to the hyperdocument router 36 and on to the requesting application 26. If desired, modification of the hyperdocument may be set by the user, such as by selecting an image to replace any blocked images in requested hyperdocuments.

Any technique may be used to correspond the range of possible ANN output values with the eleven categories. For example, referring to the tradeoff matrix of FIG. 15, the classifier 54 could formulate individual threshold values 98 of the possible double precision floating point value outputs of the ANN for each of the eleven categories 100. In this embodiment, a threshold value 98 is a value between 0-1, whereby if the ANN output value is less than or equal to the threshold value, the image is considered less likely to contain pornographic material. If the ANN output value is greater than the threshold value, the image is considered more likely to contain pornographic material.

Figure 17:
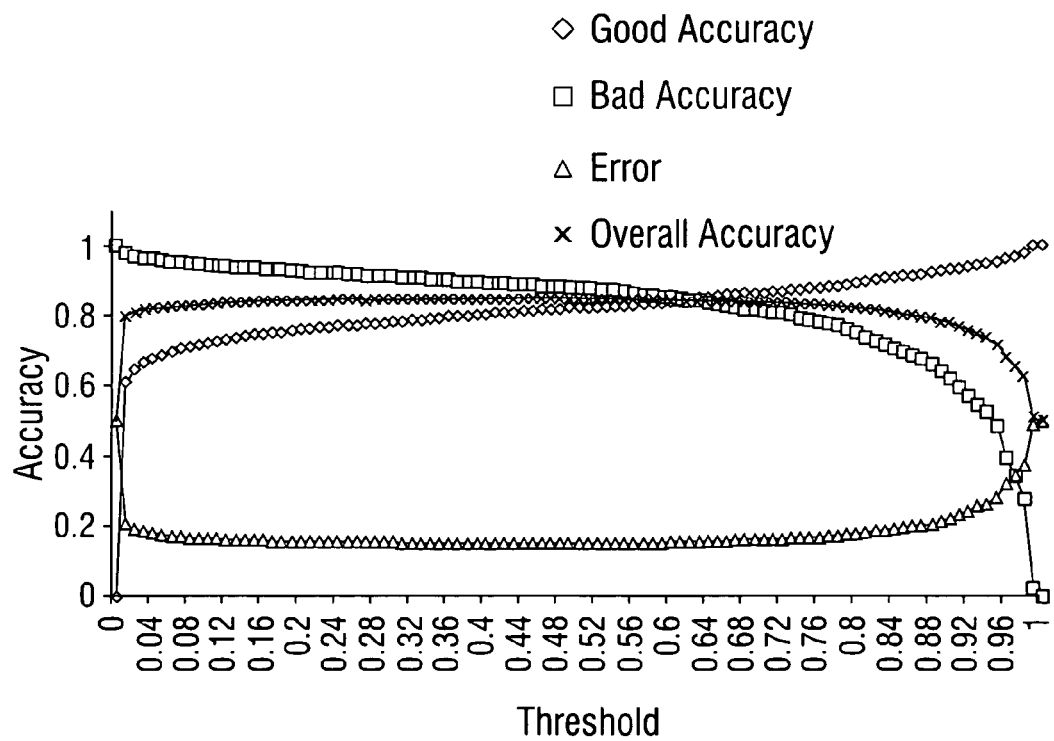
FIG. 17 is a graph showing example accuracy data of an embodiment of an artificial neural network used in an embodiment of a hyperdocument evaluation system in accordance with the present invention.

To calculate the threshold values, the exemplary classifier 54 examines the Overall Accuracy of the ANN. For example, the tradeoff between "Good Accuracy" 102 and "Bad Accuracy" 104 on the Overall Accuracy of the ANN 50 may be considered. Good Accuracy is the percentage of times the HES 18 was correct at concluding that an image did not contain pornographic material at a particular category level. Bad Accuracy is the percentage of times the HES 18 was correct at concluding that an image did contain pornographic material at a particular category level. FIG. 17 illustrates an example of the tradeoff of threshold settings on Overall Accuracy of the ANN as it affects Good and Bad Accuracy. In this embodiment, setting a higher threshold increases the Good Accuracy, as more images are identified as "good" (not containing pornographic material) since the ANN output value has a higher probability of being less than or equal to the threshold value, while at the same time decreasing the Bad Accuracy. Likewise, lowering a threshold value increases the Bad Accuracy since the ANN output value has a higher probability of being greater than the threshold, while at the same time decreasing the Good Accuracy. Determining the best threshold value for each user level category in this example depends upon the Overall Accuracy of the ANN 50 taking into account the tradeoff between Good Accuracy and Bad Accuracy. The Overall Accuracy for each category threshold value of this example is shown in FIG. 15 as the "Rule" 108.

In this embodiment, if the output value from the ANN is less than or equal to the threshold value corresponding to the user selected category, then the image is considered "good" (not likely to contain pornographic content) and a Block Image Indicator is set to allow the image to be provided. If the output value from the ANN is greater than the threshold value for the user selected category, the image is considered "bad" (likely to contain pornographic content) and the Block Image Indicator is set to block the image.

Figure 16:
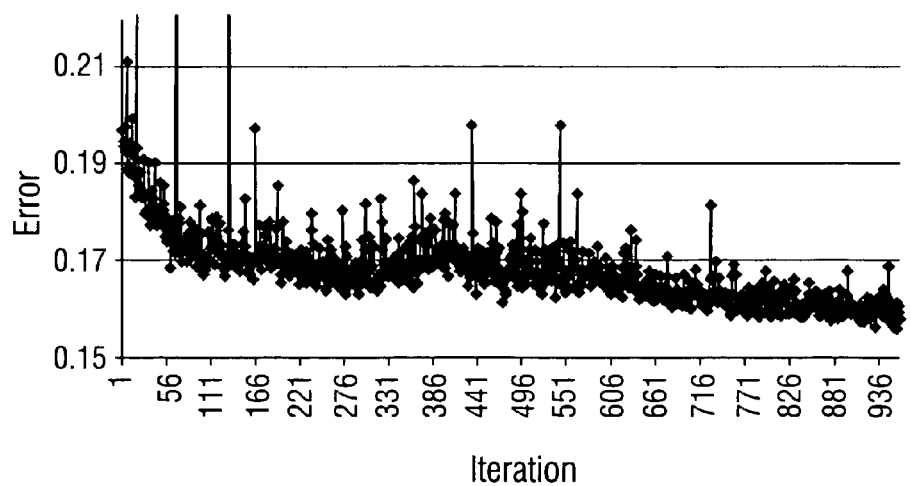
FIG. 16 is a graph showing example error data during training of an example artificial neural network used in an embodiment of a hyperdocument evaluation system in accordance with the present invention.

The ANN 50 of this embodiment has been trained on hundreds of thousands of images that have been classified by hand into "good" and "bad" sets. Each set was randomly divided into training images and test images in order to have an independent test set. Training this ANN on an individual image was performed by back propagation as briefly described above, comparing the desired output of the ANN with the expected output, 0 for "good" and 1 for "bad". The ANN was trained in multiple iterations or epochs. For each epoch, the ANN was trained on "good" and "bad" images (at random from each set) until a certain number of images, specified at the start of the training, was reached. After each epoch, the ANN was tested on each image in the utilized test set of both "good" and "bad" images. The Overall, Good and Bad Accuracies were then computed and saved. After a certain number of training epochs, the ANN was believed to become more accurate. The ANN was saved after each epoch and an ANN believed to have the highest Overall Accuracy was selected for use in the HES 18. The present Photo No-No embodiment was trained millions of times on thousands of images in each epoch, yielding increasing Overall Accuracy and decreasing error as outlined in FIG. 16.

Various components discussed above include software routines or modules. Such software routines or modules are executable on corresponding control units. The various control units include microprocessors, microcontrollers, or other control or computing devices. The software routines or modules are stored as instructions in one or more storage modules. Instructions that make up the various software routines or modules when executed by a respective control unit cause the corresponding device or system to perform programmed acts.

The storage modules referred to in this discussion include at least one machine-readable storage media for storing data and instructions. The storage media may include different forms of memory including semiconductor memory devices, such as dynamic or static random access memories (DRAMs or SRAMs), erasable and programmable read-only memories (EPROMs), electrically erasable and programmable read-only memories (EEPROMs), flash memories such as Flash ROMs; non-volatile ROM; RAM; magnetic disks, such as fixed, floppy and removable disks; other magnetic media including tape; or optical media such as compact disks (CDs) or digital video disks (DVDs).

Preferred embodiments of the present invention thus offer advantages over the prior art and are well adapted to carry out one or more of the objects of the invention. It should be understood that all of the above components and any other components that may be included may have any suitable, desired size, material construction, configuration, form and quantity, as is or becomes known. The present invention is in no way limited to the methods, steps, components, configurations, dimensions, specific examples or other details described above or shown in the attached figures. Further, the above-described features are not limited to the details as described and shown. Yet further, each such feature can be used independent of any other feature. Moreover, the present invention does not require each of the above features and includes further capabilities, functions, methods, uses and applications, as will be apparent to a person skilled in the art based upon the description above and the appended drawings and claims.

Further, the methods described above need be performed in any particular order, such as the order provided above, except to the extent necessary for operability of the invention. In the description above and the appended method claims, the methods need not necessarily be performed in the order listed. Thus, the appended method claims are not limited to the particular order recited in the claims. Yet further, the methods of the present invention and the appended claims do not require use of the particular embodiments and configurations and details shown and described in the present specification and the appended figures.

While preferred embodiments of this invention have been shown and described, many variations, modifications and/or changes, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should thus be interpreted as illustrative and not limiting. Accordingly, the scope of the invention and the appended claims is not limited to the embodiments described and shown herein.

The invention claimed is:

1. A computer implemented method for evaluating hyperdocument images, the method comprising:
   retrieving a hyperdocument from an information source based upon a request from a requesting application;
   providing information about one or more images of the hyperdocument to a trained artificial neural network, the trained artificial neural network being capable of evaluating the information and providing results reflecting the evaluation, wherein the information includes a pixel color value and a pixel RGB value for each image pixel;
   converting each pixel color value into a double precision floating point value and mapping the pixel RGB value to a SVGA color by determining the closest color match; and
   determining the disposition of the hyperdocument image based upon results of the trained artificial neural network, such disposition including at least one among modifying the hyperdocument and providing the modified hyperdocument to the requesting application or other destination, providing the original hyperdocument to the requesting application or other destination and providing a replacement hyperdocument to the requesting application or other destination.

2. The method of claim 1 wherein the artificial neural network is a feed forward artificial neural network having three layers with multiple input nodes, a single hidden layer having multiple hidden nodes and one output node, the input and output of the artificial neural network being represented by double precision floating point value numbers.

3. A method for filtering content of a hyperdocument the method comprising:
   a user selecting criteria for allowable hyperdocuments;
   retrieving a hyperdocument from an information source based upon a request from a requesting application;
   providing information about content of the hyperdocument to a trained artificial neural network, the trained artificial neural network being capable of analyzing the information and providing results reflecting the analysis;
   based upon the artificial neural network results, providing the hyperdocument to the requesting application if it matches the user selected criteria; and
   comparing a hyperdocument's source location to a list of disallowed information sources and if the hyperdocument's source location is on the list, providing a designated alternate hyperdocument to the requesting application.

4. The method of claim 3 wherein the requesting application is web browser software and the hyperdocument is retrieved via the Internet.

5. The method of claim 3 further including a user designating at least one type of hyperdocument to be evaluated.

6. The method of claim 3 wherein the hyperdocument includes at least one image, further including converting hyperdocument image data into input values for the artificial neural network by at least one among scaling, color analysis and ordering of the image data.

7. The method of claim 6 wherein the artificial neural network evaluates the likelihood the hyperdocument image includes pornographic subject matter, the artificial neural network providing numeric output value that reflect the probability that the image includes pornographic subject matter.

8. The method of claim 7 further including
   categorizing the numeric output value of the artificial neural network into one among multiple categories, the categories representing different levels of potential pornographic content ranging from YES to NO, and
   comparing the category level of the numeric output value of the artificial neural network to a desired category level selected by the user.

9. The method of claim 3 further including allowing the user selected criteria to be on a scale of allowable hyperdocuments ranging from ALL to NONE.

* * * * *